United States Patent
Kajiyama et al.

(10) Patent No.: US 12,199,524 B2
(45) Date of Patent: Jan. 14, 2025

(54) POWER CONVERSION DEVICE THAT PERFORMS POWER CONVERSION BETWEEN DC CIRCUIT AND AC CIRCUIT

(71) Applicant: Mitsubishi Electric Corporation, Tokyo (JP)

(72) Inventors: Takuya Kajiyama, Tokyo (JP); Toshiyuki Fujii, Tokyo (JP); Shuhei Fujiwara, Tokyo (JP); Ryosuke Uda, Tokyo (JP); Yoshiyuki Kono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 123 days.

(21) Appl. No.: 17/759,875

(22) PCT Filed: Mar. 11, 2020

(86) PCT No.: PCT/JP2020/010631
§ 371 (c)(1),
(2) Date: Aug. 1, 2022

(87) PCT Pub. No.: WO2021/181581
PCT Pub. Date: Sep. 16, 2021

(65) Prior Publication Data
US 2023/0124367 A1    Apr. 20, 2023

(51) Int. Cl.
*H02M 7/49* (2007.01)
*H02M 7/483* (2007.01)

(52) U.S. Cl.
CPC ........... *H02M 7/49* (2013.01); *H02M 7/4835* (2021.05)

(58) Field of Classification Search
CPC ...... H02M 7/49; H02M 7/4835; H02M 7/483; H02M 7/797; H02M 1/08; H02M 1/0003; H02M 1/0085
See application file for complete search history.

(56) References Cited

U.S. PATENT DOCUMENTS

2019/0044427 A1 * 2/2019 Fujii ................. H02M 7/483

FOREIGN PATENT DOCUMENTS

| JP | 6509352 B2 | 5/2019 | |
| JP | 6797333 B1 * | 12/2020 | .......... H02M 7/4833 |
| WO | WO-2017046908 A1 * | 3/2017 | .............. H02M 1/08 |

OTHER PUBLICATIONS

Translation JP6797333 (Year: 2020).*
(Continued)

*Primary Examiner* — Thienvu V Tran
*Assistant Examiner* — Yahveh Comas Torres
(74) *Attorney, Agent, or Firm* — Buchanan Ingersoll & Rooney

(57) ABSTRACT

A power conversion device includes a plurality of leg circuits and a control device. The control device controls an output voltage at a first converter cell, which is controlled not based on the circulating current, based on a first voltage instruction value. The control device controls an output voltage at a second converter cell using a first value based on a deviation between a circulating current and a circulating current instruction value and a second value based on a deviation between a capacitor voltage and a capacitor voltage instruction value in the second converter cell. When the capacitor voltage at the second converter cell is less than a first threshold, the control device linearly combines an auxiliary voltage instruction value including at least one of a DC component and a fundamental AC component of the AC circuit with the first value and the second value.

20 Claims, 5 Drawing Sheets

(56) References Cited

OTHER PUBLICATIONS

Translation WO 2017046908 (Year: 2017).*
International Search Report (PCT/ISA/210) with English translation and Written Opinion (PCT/ISA/237) mailed on Jun. 2, 2020, by the Japan Patent Office as the International Searching Authority for International Application No. PCT/JP2020/010631.
Extended European Search Report dated Mar. 20, 2023, issued in the corresponding European Patent Application No. 20923932.6, 9 pages.
Communication pursuant to Article 94(3) EPC dated Dec. 13, 2023, issued in the corresponding European Patent Application No. 20923932.6, 5 pages.

* cited by examiner

POWER CONVERSION DEVICE THAT PERFORMS POWER CONVERSION BETWEEN DC CIRCUIT AND AC CIRCUIT

TECHNICAL FIELD

The present disclosure relates to a power conversion device that performs power conversion between an alternating current and a direct current.

BACKGROUND ART

A modular multilevel converter (hereinafter, also referred to as an MMC converter) in which a plurality of unit converters are connected in cascade can easily cope with an increase in voltage by increasing the number of unit converters. The "unit converter" is also referred to as a "converter cell" or a "sub-module". The MMC converter is widely applied to a transmission and distribution system as a large-capacity static reactive power compensator or an AC-DC power conversion device for high-voltage DC power transmission. The converter cell includes a plurality of switching elements and a power storage element, and is configured of a chopper circuit, a bridge circuit, or the like.

A method for dividing a plurality of converter cells in an arm into two cell groups is known in the MMC converter. For example, in Japanese Patent No. 6509352 (PTL 1), an AC-DC conversion operation is performed by one cell group, and a circulating current is controlled by the other cell group.

CITATION LIST

Patent Literature

PTL 1: Japanese Patent No. 6509352

SUMMARY OF INVENTION

Technical Problem

However, in the method in which the other cell group controls only the circulating current as in PTL 1, when both active power and reactive power output from the power conversion device are small, the voltage at the capacitor included in the other cell group cannot be maintained, and there is a possibility that converter control fails. Accordingly, the voltage at the capacitor included in one cell group and the voltage at the capacitor included in the other cell group are required to be appropriately controlled.

An object of one aspect of the present disclosure is to provide a power conversion device capable of appropriately controlling the voltage at the capacitor included in each cell group even when one cell group and the other cell group perform different operations.

Solution to Problem

According to an embodiment, a power conversion device that performs power conversion between a DC circuit and an AC circuit is provided. A power conversion device includes a power conversion circuit unit including a plurality of leg circuits corresponding to a plurality of phases of an AC circuit. Each of the leg circuits is configured of two arms connected in series. Each of the arms includes a plurality of converter cells each having a capacitor and connected in series to each other. The power conversion device further includes a control device that controls operations of the plurality of converter cells. Each of the plurality of converter cells is a first converter cell controlled not based on a circulating current circulating between the plurality of leg circuits or a second converter cell controlled based on the circulating current. The control device controls output voltages of the plurality of the first converter cells in each arm based on a first voltage instruction value generated based on a DC current and a DC voltage of the DC circuit and an AC current and an AC voltage of each phase of the AC circuit. The control device controls the output voltages of the plurality of the second converter cells in each arm using a first value based on a deviation between the circulating current and a circulating current instruction value and a second value based on a deviation between the voltage at the capacitor and an instruction value of the voltage at the capacitor in the second converter cell. When the voltage at the capacitor in the second converter cell is less than a first threshold, the control device linearly combines an auxiliary voltage instruction value including at least one of the DC component and the fundamental AC component of the AC circuit with the first value and the second value.

Advantageous Effects of Invention

According to the present disclosure, even when one cell group and the other cell group perform different operations, the voltage at the capacitor included in each cell group can be appropriately controlled.

DESCRIPTION OF EMBODIMENTS

Figure 1:
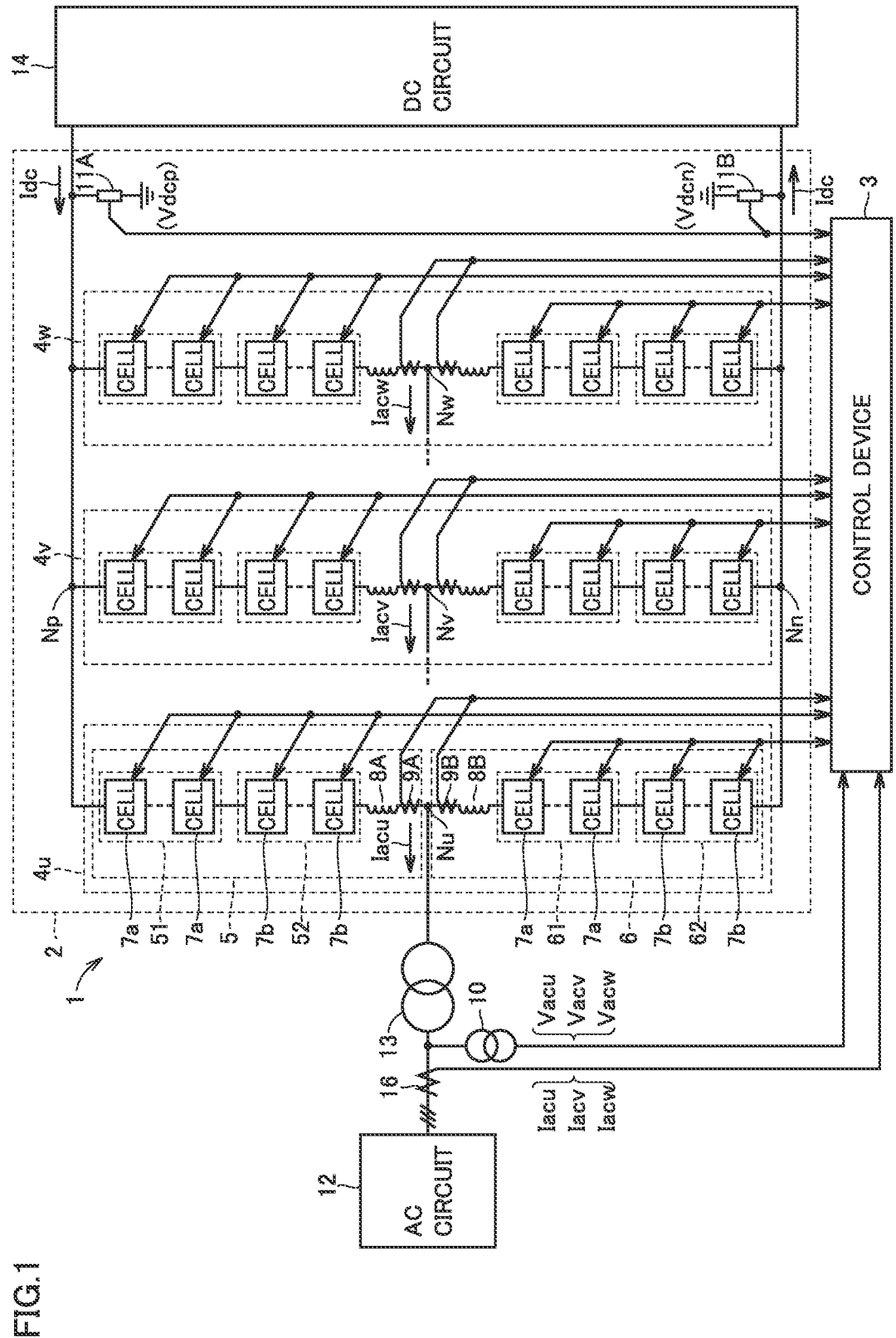
FIG. 1 is a schematic configuration diagram illustrating a power conversion device.

With reference to the drawings, embodiments of the present disclosure will be described below. In the following description, the same component is denoted by the same reference numeral. Those names and functions are the same. Thus, the detailed description thereof will not be repeated.

<Schematic Configuration of Power Conversion Device>

FIG. 1 is a schematic configuration diagram illustrating a power conversion device. With reference to FIG. 1, a power conversion device 1 is configured of a modular multilevel converter including a plurality of converter cells (corresponding to "cell" in FIG. 1) connected in series to each other. Power conversion device 1 performs power conversion between a DC circuit 14 and an AC circuit 12. Power conversion device 1 includes a power conversion circuit unit 2 and a control device 3.

Power conversion circuit unit 2 includes a plurality of leg circuits $4u$, $4v$, $4w$ (hereinafter, also collectively referred to as "leg circuits 4") connected in parallel to each other between a positive-side DC terminal (that is, a high-potential-side DC terminal) Np and a negative-side DC terminal (that is, a low-potential-side DC terminal) Nn.

Leg circuit 4 is provided in each of a plurality of phases constituting an alternating current. Leg circuit 4 is connected between AC circuit 12 and DC circuit 14, and performs the power conversion between both the circuits. FIG. 1 illustrates a case where AC circuit 12 is a three-phase AC system, and three leg circuits 4u, 4v, 4w are provided corresponding to a U-phase, a V-phase, and a W-phase, respectively.

AC terminals Nu, Nv, Nw provided in leg circuits 4u, 4v, 4w are connected to AC circuit 12 through a transformer 13. For example, AC circuit 12 is an AC power system including an AC power supply and the like. In FIG. 1, connection between AC terminals Nv, Nw and transformer 13 is not illustrated for ease of illustration.

A positive-side DC terminal Np and a negative-side DC terminal Nn that are commonly connected to each leg circuit 4 are connected to DC circuit 14. For example, DC circuit 14 is a DC terminal of a DC power system including a DC power supply network or the like or another power conversion device. In the latter case, a back to back (BTB) system connecting AC power systems having different rated frequencies or the like is configured by coupling two power conversion devices.

Instead of use of transformer 13 in FIG. 1, power conversion device 1 may be connected to AC circuit 12 through an interconnection reactor. A primary winding may be provided in each of leg circuits 4u, 4v, 4w instead of AC terminals Nu, Nv, Nw, and leg circuits 4u, 4v, 4w may be connected to transformer 13 or the interconnection reactor in terms of AC through a secondary winding magnetically coupled to the primary winding. In this case, the primary winding may be set to following reactors 8A, 8B. That is, leg circuit 4 is electrically (that is, in terms of DC or AC) connected to AC circuit 12 through a connection portion provided in each of leg circuits 4u, 4v, 4w, such as AC terminals Nu, Nv, Nw or the primary winding.

Leg circuit 4u includes two arms connected in series. Specifically, leg circuit 4u includes a positive-side arm 5 from positive-side DC terminal Np to AC terminal Nu and a negative-side arm 6 from negative-side DC terminal Nn to AC terminal Nu. The positive-side arm is also referred to as an upper arm, and the negative-side arm is also referred to as a lower arm. AC terminal Nu that is a connection point between positive-side arm 5 and negative-side arm 6 is connected to transformer 13. Positive-side DC terminal Np and negative-side DC terminal Nn are connected to DC circuit 14. Hereinafter, leg circuit 4u will be described below as a representative because leg circuits 4v, 4w have the same configuration.

Positive-side arm 5 includes a cell group 51 in which a plurality of converter cells 7a are cascade-connected, a cell group 52 in which a plurality of converter cells 7b are cascade-connected, and reactor 8A. Cell group 51, cell group 52, and reactor 8A are connected in series to each other. Negative-side arm 6 includes a cell group 61 in which the plurality of converter cells 7a are cascade-connected, a cell group 62 in which the plurality of converter cells 7b are cascade-connected, and reactor 8B. Cell group 61, cell group 62, and reactor 8B are connected in series to each other.

In the following description, the number of converter cells 7a included in each of cell group 51 and cell group 61 is set to N1. Where, N1≥2. The number of converter cells 7b included in each of cell group 52 and cell group 62 is set to N2. Where, N2≥1. In the following description, sometimes converter cells 7a and 7b are collectively referred to as a converter cell 7. For ease of illustration, the plurality of converter cells 7a are disposed adjacent to each other and the plurality of converter cells 7b are disposed adjacent to each other in each arm, but limitation to the configuration is not intended. The plurality of converter cells 7a may be disposed in a dispersed manner, and the plurality of converter cells 7b may be disposed in a dispersed manner. Each of the plurality of converter cells 7 included in each leg circuit 4 is converter cell 7a or converter cell 7b.

A position where reactor 8A is inserted may be any position of positive-side arm 5 of leg circuit 4u, and a position where reactor 8B is inserted may be any position of negative-side arm 6 of leg circuit 4u. A plurality of reactors 8A and a plurality of reactors 8B may be provided. Inductance values of the reactors may be different from each other. Only reactor 8A of positive-side arm 5 or only reactor 8B of negative-side arm 6 may be provided.

Although details will be described later, cell groups 51, 61 and the cell groups 52, 62 have different roles. Specifically, converter cell 7a of cell groups 51, 61 is not used for controlling the circulating current, but is in charge of controlling (that is, AC-DC conversion control) an AC electric quantity and a DC electric quantity, and converter cell 7b of cell groups 52, 62 is in charge of controlling the circulating current.

Power conversion device 1 includes an AC voltage detector 10, an AC current detector 16, DC voltage detectors 11A, 11B, and arm current detectors 9A, 9B provided in each leg circuit 4 as detectors that measure an electric quantity of (for example, current and voltage) used for control. Signals detected by these detectors are input to control device 3.

In FIG. 1, for ease of illustration, a signal line of the signal input from each detector to control device 3 and a signal line of the signal input and output between control device 3 and each converter cell 7 are partially collectively illustrated, but are actually provided for each detector and each converter cell 7. The signal line between each converter cell 7 and control device 3 may be provided separately for transmission and for reception. For example, the signal line is formed of an optical fiber.

AC voltage detector 10 detects a U-phase AC voltage Vacu, a V-phase AC voltage Vacv, and a W-phase AC voltage Vacw of AC circuit 12. AC current detector 16 detects a U-phase AC current Iacu, a V-phase AC current Iacv, and a W-phase AC current Iacw of AC circuit 12. DC voltage detector 11A detects a DC voltage Vdcp of positive-side DC terminal Np connected to DC circuit 14. DC voltage detector 11B detects a DC voltage Vdcn of negative-side DC terminal Nn connected to DC circuit 14.

Arm current detectors 9A, 9B provided in U-phase leg circuit 4u detect a positive-side arm current Ipu flowing through positive-side arm 5 and a negative-side arm current Inu flowing through negative-side arm 6. Arm current detectors 9A, 9B provided in V-phase leg circuit 4v detect a positive-side arm current Ipv and a negative-side arm current Inv. Arm current detectors 9A, 9B provided in W-phase leg circuit 4w detect a positive-side arm current Ipw and a negative-side arm current Inw. In the following description, positive-side arm currents Ipu, Ipv, Ipw are collectively referred to as a positive-side arm current Iarmp, negative-side arm currents Inu, Inv, Inw are collectively referred to as a negative-side arm current Iarmn, and positive-side arm current Iarmp and negative-side arm current Iarmn are collectively referred to as an arm current Iarm. In arm current Iarm, a current flowing from positive-side DC terminal Np toward negative-side DC terminal Nn is set to positive.

Control device 3 may be configured of a dedicated circuit, and a part or all of the dedicated circuit may be configured of a field programmable gate array (FPGA), a microprocessor, or the like. Typically, control device 3 includes an auxiliary transformer, an analog to digital (AD) converter, an arithmetic unit, and the like as a hardware configuration. The arithmetic unit includes a central processing unit (CPU), a random access memory (RAM), and a read only memory (ROM). The AD converter includes an analog filter, a sample hold circuit, and a multiplexer. For example, control device 3 may be configured of a digital protection control device.

<Configuration Example of Converter Cell>

Figure 2:
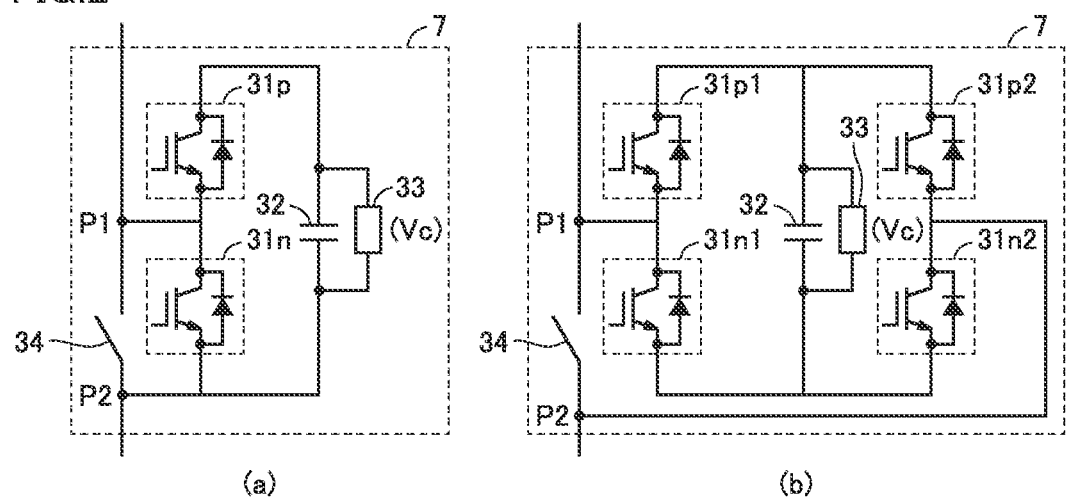
FIG. 2 is a circuit diagram illustrating an example of a converter cell constituting a cell group.

FIG. 2 is a circuit diagram illustrating an example of the converter cell constituting the cell group. Converter cell 7 in FIG. 2(a) has a circuit configuration called a half-bridge configuration. Converter cell 7 includes a series body formed by connecting two switching elements 31p, 31n in series, a capacitor 32 as an energy accumulator, a bypass switch 34, and a voltage detector 33. The series body and capacitor 32 are connected in parallel. Voltage detector 33 detects a capacitor voltage Vc that is the voltage at both ends of capacitor 32.

Converter cell 7 in FIG. 2(b) has a circuit configuration called a full-bridge configuration. Converter cell 7 includes a first series body formed by connecting two switching elements 31p1, 31n1 in series, a second series body formed by connecting two switching elements 31p2, 31n2 in series, capacitor 32, bypass switch 34, and voltage detector 33. The first series body, the second series body, and capacitor 32 are connected in parallel. Voltage detector 33 detects capacitor voltage Vc.

Two switching elements 31p, 31n in FIG. 2(a) and four switching elements 31p1, 31n1, 31p2, 31n2 in FIG. 2(b) are configured such that a freewheeling diode (FWD) is connected in antiparallel to a self-arc-extinguishing semiconductor switching element such as an insulated gate bipolar transistor (IGBT), a gate commutated turn-off (GCT) thyristor, or a metal oxide semiconductor field effect transistor (MOSFET). In FIGS. 2(a) and 2(b), a capacitor such as a film capacitor is mainly used as capacitor 32.

In the following description, switching elements 31p, 31n, 31p1, 31n1, 31p2, 31n2 are also collectively referred to as a switching element 31. In addition, on and off of the semiconductor switching element in switching element 31 will be simply referred to as "on and off of switching element 31".

With reference to FIG. 2(a), both terminals of switching element 31n are referred to as input and output terminals P1, P2. Voltage across capacitor 32 and zero voltage are output by switching operations of switching elements 31p, 31n. For example, when switching element 31p is turned on and when switching element 31n is turned off, the voltage across capacitor 32 is output. When switching element 31p is turned off and when switching element 31n is turned on, zero voltage is output. In FIG. 2(a), both terminals of switching element 31n are set as input and output terminals P1, P2, but both terminals of switching element 31p may be set as input and output terminals P1, P2, and in this case, the operation is reversed.

Bypass switch 34 is connected between input and output terminals P1, P2. In FIG. 2(a), bypass switch 34 is connected in parallel to switching element 31n. However, when both terminals of switching element 31p are input and output terminals P1, P2, bypass switch 34 is connected in parallel to switching element 31p. Converter cell 7 is short-circuited by turning on bypass switch 34.

With reference to FIG. 2(b), a midpoint between switching element 31p1 and switching element 31n1 and a midpoint between switching element 31p2 and switching element 31n2 are set to input and output terminals P1, P2 of converter cell 7. Converter cell 7 in FIG. 2(b) outputs positive voltage or zero voltage by constantly turning on switching element 31n2, constantly turning off switching element 31p2, and alternately turning on switching elements 31p1, 31n1. In addition, converter cell 7 in FIG. 2(b) can output zero voltage or negative voltage by constantly turning off switching element 31n2, constantly turning on switching element 31p2, and alternately turning on switching elements 31p1, 31n1.

Bypass switch 34 is connected between input and output terminals P1, P2. Bypass switch 34 is connected in parallel to the series body of switching elements 31n1, 31n2. Converter cell 7 is short-circuited by turning on bypass switch 34.

In the following description, the case where converter cells 7a, 7b are configured as a half-bridge cell in FIG. 2(a) and the semiconductor switching element and the capacitor as the energy accumulation element are used will be described as an example. However, converter cells 7a, 7b may have a full-bride configuration in FIG. 2(b). A converter cell other than the configuration described above, for example, a converter cell to which a circuit configuration called a clamped double cell or the like is applied may be used, and the switching element and the energy accumulation element are not limited to those described above.

<Configuration of Control Device 3>

Figure 3:
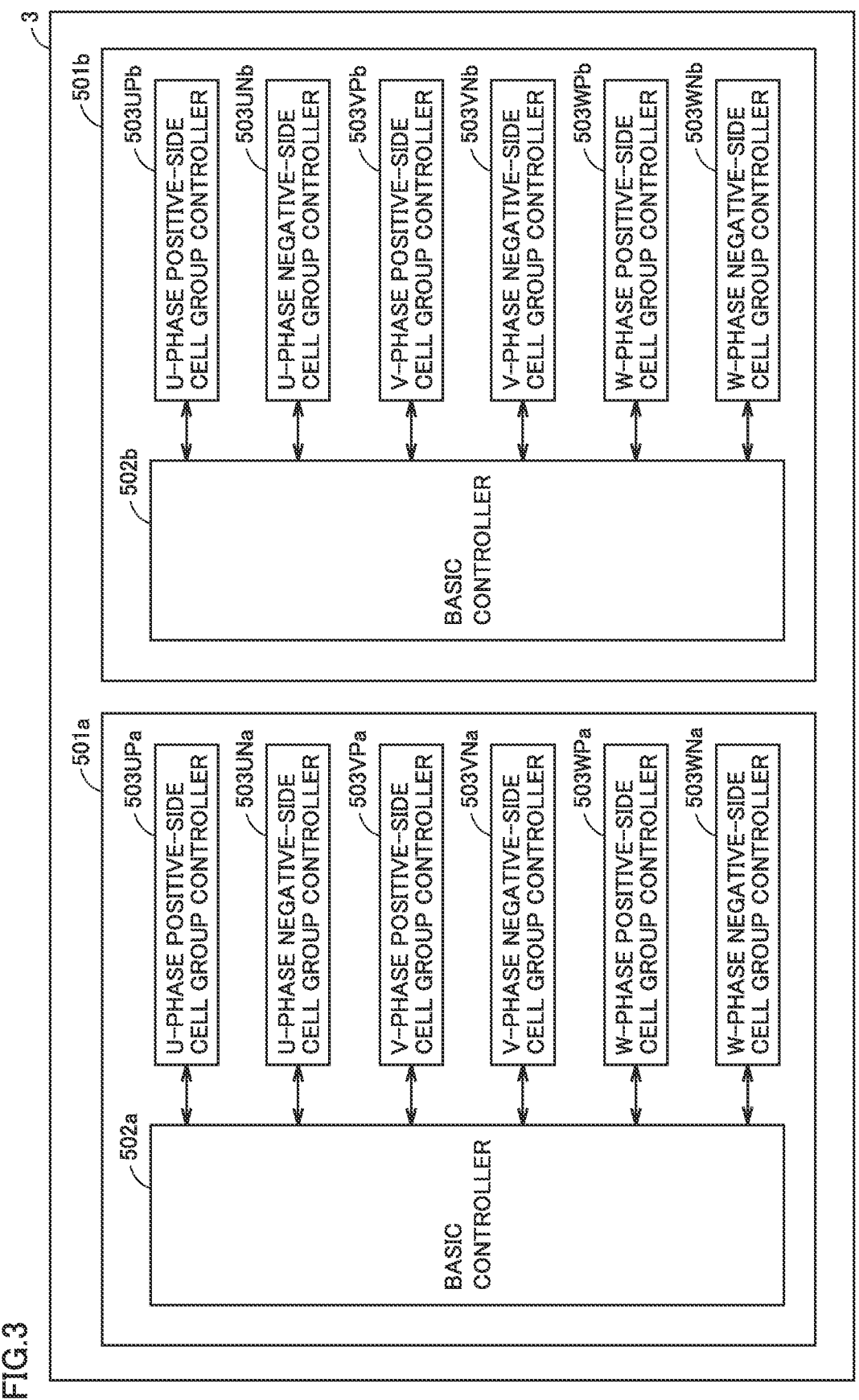
FIG. 3 is a view illustrating an internal configuration of a control device.

FIG. 3 is a view illustrating an internal configuration of control device 3. With reference to FIG. 3, control device 3 includes switching controllers 501a, 501b (hereinafter, also collectively referred to as a "switching controller 501"). Switching controller 501a controls on and off of each switching element 31 of converter cell 7a. Switching controller 501b controls on and off of each switching element 31 of converter cell 7b.

Switching controller 501a includes a basic controller 502a, a U-phase positive-side cell group controller 503UPa, a U-phase negative-side cell group controller 503UNa, a V-phase positive-side cell group controller 503VPa, a V-phase negative-side cell group controller 503VNa, a W-phase positive-side cell group controller 503WPa, and a W-phase negative-side cell group controller 503WNa. Switching controller 501b includes a basic controller 502b, a U-phase positive-side cell group controller 503UPb, a U-phase negative-side cell group controller 503UNb, a V-phase positive-side cell group controller 503VPb, a V-phase negative-side cell group controller 503VNb, a W-phase positive-side cell group controller 503WPb, and a W-phase negative-side cell group controller 503WNb.

In the following description, U-phase positive-side cell group controller 503UPa, V-phase positive-side cell group controller 503VPa, and W-phase positive-side cell group controller 503WPa are also collectively referred to as a positive-side cell group controller 503Pa. U-phase negative-side cell group controller 503UNa, V-phase negative-side cell group controller 503VNa, and W-phase negative-side cell group controller 503WNa are also collectively referred to as a negative-side cell group controller 503Na. Positive-side cell group controller 503Pa and negative-side cell group controller 503Na are also collectively referred to as a cell group controller 503a. Positive-side cell group controller 503Pa controls the operation of cell group 51, and negative-side cell group controller 503Na controls the operation of cell group 61.

U-phase positive-side cell group controller 503UPb, V-phase positive-side cell group controller 503VPb, and W-phase positive-side cell group controller 503WPb are also collectively referred to as a positive-side cell group controller 503Pb. U-phase negative-side cell group controller 503UNb, V-phase negative-side cell group controller 503VNb, and W-phase negative-side cell group controller 503WNb are also collectively referred to as a negative-side cell group controller 503Nb. Positive-side cell group controller 503Pb and negative-side cell group controller 503Nb are also collectively referred to as a cell group controller 503b. Positive-side cell group controller 503Pb controls the operation of cell group 52, and negative-side cell group controller 503Nb controls the operation of cell group 62.

Furthermore, basic controller 502a and basic controller 502b are also collectively referred to as a basic controller 502, and cell group controller 503a and cell group controller 503b are also collectively referred to as a cell group controller 503.

Figure 4:
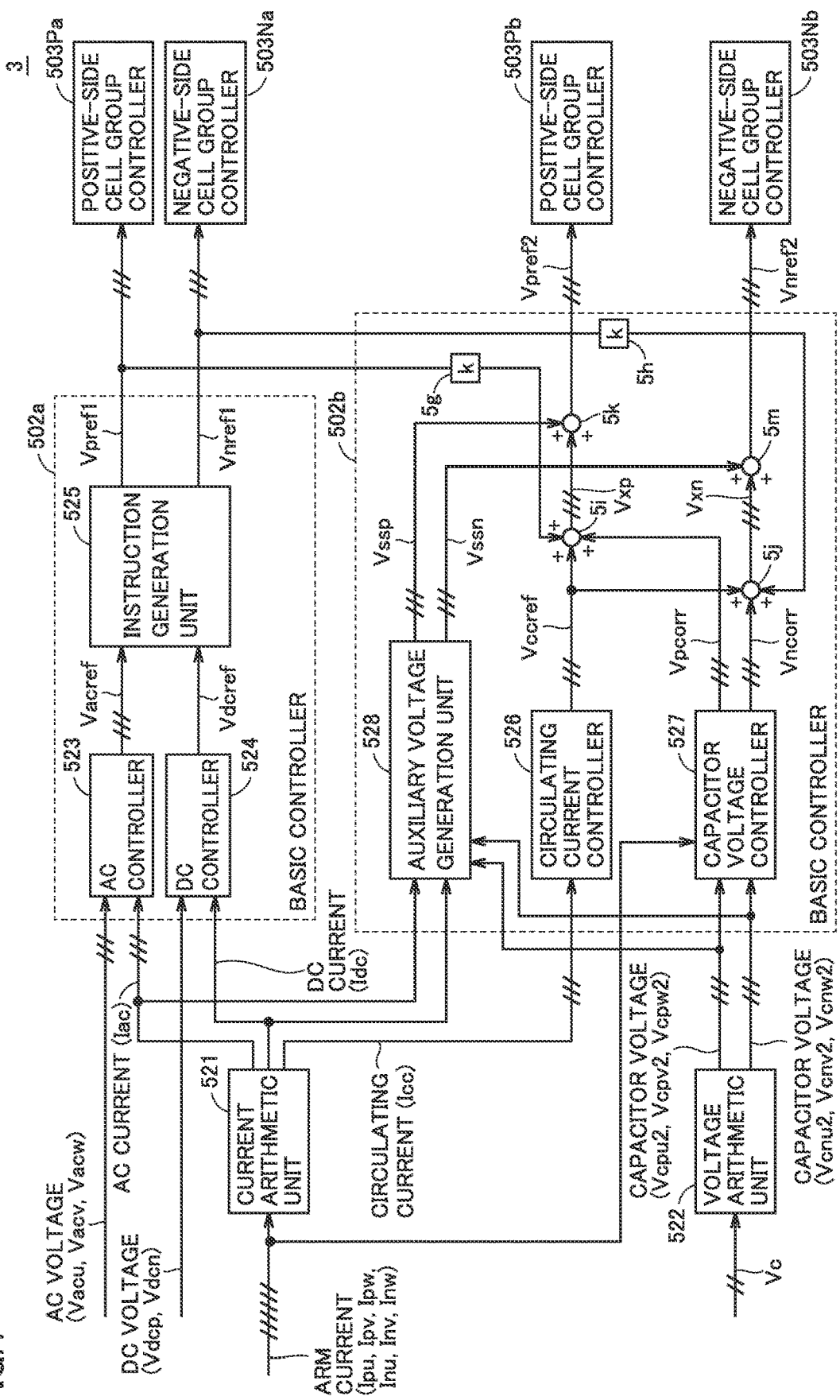
FIG. 4 is a view illustrating a configuration of a basic controller.

FIG. 4 is a view illustrating a configuration of basic controller 502. With reference to FIG. 4, control device 3 includes basic controllers 502a, 502b, a current arithmetic unit 521, a voltage arithmetic unit 522, positive-side cell group controllers 503Pa, 503Pb, and negative-side cell group controllers 503Na, 503Nb. Basic controller 502a includes an AC controller 523, a DC controller 524, and an instruction generation unit 525. Basic controller 502b includes a circulating current controller 526, a capacitor voltage controller 527, an auxiliary voltage generation unit 528, adders 5i, 5j, 5k, 5m, and gain circuits 5g, 5h.

Basic controller 502a supplies voltage instruction values Vpref1, Vnref1 to positive-side cell group controller 503Pa and negative-side cell group controller 503Na, respectively. Basic controller 502b supplies voltage instruction values Vpref2, Vnref2 to positive-side cell group controller 503Pb and negative-side cell group controller 503Nb, respectively.

Voltage instruction values Vpref1, Vnref1 supplied to positive-side cell group controller 503Pa and negative-side cell group controller 503Na for controlling AC-DC conversion are not based on a detection value of a circulating current Icc. Voltage instruction values Vpref2, Vnref2 supplied to the positive-side cell group controller 503Pb and negative-side cell group controller 503Nb for controlling the circulating current are based on the detection value of circulating current Icc. From this, it can be said that converter cells 7a of cell groups 51, 61 are controlled not based on the circulating current, and converter cells 7b of cell groups 52, 62 are controlled based on the circulating current.

Current arithmetic unit 521 takes in the positive-side arm currents Ipu, Ipv, Ipw detected by arm current detector 9A and the negative-side arm currents Inu, Inv, Inw detected by arm current detector 9B. Current arithmetic unit 521 operates AC currents Iacu, Iacv, Iacw (hereinafter, also collectively referred to as an "AC current Iac"), a DC current Idc, and circulating currents Iccu, Iccv, Iccw (hereinafter, also collectively referred to as a "circulating current Icc") from the taken arm current. Current arithmetic unit 521 outputs each AC current Iac to AC controller 523 and auxiliary voltage generation unit 528, outputs DC current Idc to DC controller 524 and auxiliary voltage generation unit 528, and outputs circulating current Icc to circulating current controller 526.

U-phase AC current Iacu, V-phase AC current Iacv, and W-phase AC current Iacw are defined such that a current flowing from AC terminals Nu, Nv, Nw of each leg circuit 4 toward transformer 13 is set to positive. DC current Idc is defined such that a direction from DC circuit 14 toward positive-side DC terminal Np and a direction from negative-side DC terminal Nn toward DC circuit 14 are set to positive. Circulating currents Iccu, Iccv, Iccw flowing through leg circuits 4u, 4v, 4w are defined such that the direction from positive-side DC terminal Np toward negative-side DC terminal Nn is set to positive.

U-phase, V-phase, W-phase AC voltages Vacu, Vacv, Vacw (hereinafter, also collectively referred to as an "AC voltage Vac") detected by AC voltage detector 10 are further input to AC controller 523. AC controller 523 generates U-phase, V-phase, W-phase AC voltage instruction values Vacrefu, Vacrefv, Vacrefw (hereinafter, also collectively referred to as an "AC voltage instruction value Vacref") based on AC current Iac and AC voltage Vac.

DC voltages Vdcp, Vdcn detected by DC voltage detectors 11A, 11B are further input to DC controller 524. DC controller 524 generates a DC voltage instruction value Vdcref based on DC voltage (that is, the voltage between the DC terminals) Vdc and the DC current Idc of DC circuit 14 calculated from DC voltages Vdcp, Vdcn.

Instruction generation unit 525 generates voltage instruction values Vpref1u, Vnref1u used for U-phase cell groups 51, 61 based on U-phase AC voltage instruction value Vacrefu and DC voltage instruction value Vdcref. Instruction generation unit 525 generates voltage instruction values Vpref1v, Vnref1v used for V-phase cell groups 51, 61 based on a V-phase AC voltage instruction value Vacrefv and DC voltage instruction value Vdcref. Instruction generation unit 525 generates voltage instruction values Vpref1w, Vnref1w used for W-phase cell groups 51, 61 based on a W-phase AC voltage instruction value Vacrefw and DC voltage instruction value Vdcref.

Voltage instruction values Vpref1u, Vpref1v, Vpref1w (also collectively referred to as a "voltage instruction value Vpref1") are supplied to positive-side cell group controller 503Pa. Voltage instruction values Vnref1u, Vnref1v, Vnref1w (also collectively referred to as a "voltage instruction value Vnref1") are supplied to negative-side cell group controller 503Na.

Voltage arithmetic unit 522 receives information about capacitor voltage Vc from each converter cell 7b provided in cell groups 52, 62 of each leg circuit 4. Voltage arithmetic unit 522 calculates a representative value Vcp2 of the plurality of capacitor voltages of cell group 52 and calculates a representative value Vcn2 of the plurality of capacitor voltages of cell group 62 for each phase based on the information about each capacitor voltage Vc. Representative values Vcp2 of the U phase, the V phase, and the W phase are described as Vcpu2, Vcpv2, and Vcpw2, respectively, and representative values Vcn2 of the U phase, the V phase, and the W phase are described as Vcnu2, Vcnv2, and Vcnw2, respectively.

An average value, a median value, a maximum value, a minimum value, or the like of capacitor voltage Vc of each cell group can be appropriately applied for the arithmetic operation of the representative value. Voltage arithmetic unit 522 outputs representative values Vcpu2, Vcpv2, Vcpw2 of the capacitor voltages of the respective cell groups 52 and representative values Vcnu2, Vcnv2, Vcnw2 of the capacitor voltages of the respective cell groups 62 to capacitor voltage controller 527.

Capacitor voltage controller 527 receives information about each arm current Iarm, and receives information about capacitor voltages Vcpu2, Vcpv2, Vcpw2, Vcnu2, Vcnv2, Vcnw2 from voltage arithmetic unit 522.

Capacitor voltage controller 527 generates a correction value Vpcorr in order to correct voltage instruction value Vpref2 for cell group 52 based on each arm current Iarm and capacitor voltages Vcpu2, Vcpv2, Vcpw2, and outputs generated correction value Vpcorr to adder 5i. Capacitor voltage controller 527 generates a correction value Vncorr in order to correct a voltage instruction value Vnref2 for cell group 62 based on each arm current Iarm and capacitor voltages Vcnu2, Vcnv2, Vcnw2, and outputs generated correction value Vncorr to adder 5j.

Circulating current controller 526 generates circulating voltage instruction values Vccrefu, Vccrefv, Vccrefw (hereinafter, also collectively referred to as a "circulating voltage instruction value Vccref") for the circulating current control of each phase based on circulating currents Iccu, Iccv, Iccw. Adder 5i adds voltage instruction value Vccref, a value obtained by multiplying voltage instruction value Vpref1 for cell group 51 by a gain k in gain circuit 5g, and correction value Vpcorr for each phase to generate a voltage value Vxp. Adder 5j adds voltage instruction value Vccref, a value obtained by multiplying voltage instruction value Vnref1 for cell group 61 by gain k in gain circuit 5h, and correction value Vncorr for each phase to generate a voltage value Vxn.

When the capacitor voltages at cell groups 52, 62 decrease, auxiliary voltage generation unit 528 generates auxiliary voltage instruction values Vssp, Vssn in order to assist the charge of the capacitors of cell groups 52, 62 based on DC current Idc and AC current Iac.

Voltage value Vxp is added to auxiliary voltage instruction value Vssp for each phase in adder 5k. As a result, voltage instruction value Vpref2 for cell group 52 is generated in order to control the circulating current. Voltage instruction value Vpref2 is supplied to positive-side cell group controller 503Pb. Voltage value Vxn is added to auxiliary voltage instruction value Vssn for each phase in adder 5m. As a result, voltage instruction value Vnref2 for cell group 62 is generated in order to control the circulating current. Voltage instruction value Vnref2 is supplied to negative-side cell group controller 503Nb.

As described above, basic controller 502a controls the output voltages at the plurality of converter cells 7a in each arm based on voltage instruction values Vpref1, Vnref1 generated by DC current Idc and DC voltage Vdc of DC circuit 14 and AC current Iac and AC voltage Vac of each phase of AC circuit 12.

When the capacitor voltage at converter cell 7b decreases, basic controller 502b linearly combines auxiliary voltage instruction values Vssp, Vssn, voltage instruction value Vccref, voltage instruction values Vpref1, Vnref1, and correction values Vpcorr, Vncorr to generate voltage instruction values Vpref2, Vnref2 controlling the output voltages of the plurality of converter cells 7b. When the capacitor voltage at converter cell 7b does not decrease, auxiliary voltage instruction values Vssp, Vssn are not generated. In this case, basic controller 502b linearly combines voltage instruction value Vccref, voltage instruction values Vpref1, Vnref1, and correction values Vpcorr, Vncorr to generate voltage instruction values Vpref2, Vnref2 controlling the output voltages of the plurality of converter cells 7b.

<Detailed Operation of Control Device 3>
(Operation of Current Arithmetic Unit)

With reference to FIG. 1, the connection point between positive-side arm 5 and negative-side arm 6 of U-phase leg circuit 4u is AC terminal Nu, and AC terminal Nu is connected to transformer 13. Accordingly, AC current Iacu flowing from AC terminal Nu toward transformer 13 is a current value obtained by subtracting negative-side arm current Inu from positive-side arm current Ipu as in the following Equation (1).

$$Iacu = Ipu - Inu \quad (1)$$

Assuming that the average value of positive-side arm current Ipu and negative-side arm current Inu is a common current flowing through positive-side arm 5 and negative-side arm 6, this current is a leg current Icomu flowing through the DC terminal of leg circuit 4u. Leg current Icomu is expressed by the following Equation (2).

$$Icomu = (Ipu - Inu)/2 \quad (2)$$

Also in the V phase, AC current Iacv and a leg current Icomv are calculated using positive-side arm current Ipv and negative-side arm current Inv, and also in the W phase, AC current Iacw and a leg current Icomw are calculated using positive-side arm current Ipw and negative-side arm current Inw. Specifically, they are represented by the following Equations (3) to (6).

$$Iacv = Ipv - Inv \quad (3)$$

$$Icomv = (Ipv - Inv)/2 \quad (4)$$

$$Iacw = Ipw - Inw \quad (5)$$

$$Icomw = (Ipw + Inw)/2 \quad (6)$$

The positive-side DC terminals of leg circuits 4u, 4v, 4w of the respective phases are commonly connected as positive-side DC terminal Np, and the negative-side DC terminals are commonly connected as negative-side DC terminal Nn. From this configuration, the current value obtained by adding leg currents Icomu, Icomv, Icomw of the respective phases becomes DC current Idc that flows in from the positive-side terminal of DC circuit 14 and feeds back to DC circuit 14 through the negative-side terminal. Accordingly, DC current Idc is expressed as the following Equation (7).

$$Idc = Icomu + Icomv + Icomw \quad (7)$$

When the DC current components included in the leg current are equally shared by the respective phases, the current capacity of the converter cell can be equalized. With this taken into consideration, the difference between the leg current and ⅓ of the DC current value can be operated as the current value of the circulating current that does not flow through DC circuit 14 but flows between the legs of each phase. Consequently, circulation currents Iccu, Iccv, Iccw of the U phase, the V phase, and the W phase are expressed as the following Equations (8), (9), (10).

$$Iccu = Icomu - Idc/3 \quad (8)$$

$$Iccv = Icomv - Idc/3 \quad (9)$$

$$Iccw = Icomw - Idc/3 \quad (10)$$

Current arithmetic unit 521 in FIG. 4 operates AC currents Iacu, Iacv, Iacw, the DC current Idc, and the circulation currents Iccu, Iccv, Iccw from positive-side arm currents Ipu, Ipv, Ipw and negative-side arm currents Inu, Inv, Inw according to the above equation.

(Operation of AC Controller 523)

From AC voltages Vacu, Vacv, Vacw detected by AC voltage detector 10 and AC currents Iacu, Iacv, Iacw output from current arithmetic unit 521, AC controller 523 outputs the AC voltages to be output from converter cells 7 constituting power conversion device 1 as AC voltage instruction values Vacrefu, Vacrefv, Vacrefw.

For example, AC controller 523 is configured of an AC current controller that performs feedback control such that the AC current value is matched with the AC current instruction value, an AC voltage controller that performs feedback control such that the AC voltage value is matched with the AC voltage instruction value, and the like according to a function required for power conversion device 1. Alternatively, AC controller 523 may be configured of a power controller that obtains power from the AC current value and the AC voltage value and performs feedback control such that the power value becomes a desired value. In practice, one or a plurality of the AC current controllers, the AC voltage controllers, and the power controllers are combined to configure and operate AC controller 523.

Because the AC current controller described above controls the current output to AC circuit 12 through transformer 13, the voltage component controlling the current is a positive phase component and a reversed phase component of the multi-phase AC voltage or a component known as a normal mode component. Similarly, the AC voltage controller outputs the positive phase component and the reversed phase component to AC circuit 12 through transformer 13.

When the three-phase AC voltage is output to AC circuit 12, it is also conceivable to output a voltage component common to the three phases, which are known as a zero-phase component or a common mode component, to AC circuit 12 in addition to these positive and negative phase components. For example, when a third harmonic wave having a frequency three times the fundamental wave frequency is superimposed on the zero-phase component, it is known that the fundamental AC component that can be output by converter cell 7 can be increased by about 15%.

Furthermore, by outputting a constant zero-phase component, the following effects can be obtained. In power conversion device 1 having the configuration in FIG. 1, the AC voltage component output from cell group 51 and the AC voltage component output from cell group 61 have opposite polarities, and the DC voltage component output from cell group 51 and the DC voltage component output from cell group 61 have the same polarity. Accordingly, when a certain zero-phase component is included in the AC voltage component, the zero-phase component is superimposed on the DC voltage component output from cell group 51 and the DC voltage component output from cell group 61 in the positive and negative opposite directions. As a result, because the difference is generated between the DC power output from cell group 51 and the DC power output from cell group 61, the energy accumulated in capacitor 32 included in each converter cell 7 can be exchanged between cell group 51 and cell group 61. Thus, the voltage value of capacitor 32 of each converter cell 7 constituting cell group 51 and the voltage value of capacitor 32 of converter cell 7 constituting cell group 61 can be balanced, and the zero-phase voltage can be used for such balance control.

(Operation of DC Controller 524)

DC controller 524 operates a DC inter-terminal voltage Vdc from the difference voltage between DC voltages Vdcp, Vdcn detected by DC voltage detectors 11A, 11B, and is expressed as the following Equation (11).

$$Vdc = Vdcp - Vdcn \quad (11)$$

DC controller 524 generates and outputs the DC voltage that should be output by converter cell 7 as DC voltage instruction value Vdcref from DC inter-terminal voltage Vdc and DC current Idc.

For example, DC controller 524 is configured by combining any one or a plurality of the DC current controllers that control the DC current, the DC voltage controllers that control the DC voltage, and the DC power controllers that control the DC power. The DC voltage component output from cell group 51 and the DC voltage component output from cell group 61 have the same polarity according to DC voltage instruction value Vdcref output from the DC voltage controller, the DC current controller, and the DC power controller. Because cell groups 51, 61 are connected in series, the output voltages of cell groups 51, 61 are combined, and the combined voltage becomes a voltage component generated between the positive-side DC terminal and the negative-side DC terminal of leg circuit 4. DC voltage instruction value Vdcref is given to positive-side cell group controller 503Pa and negative-side cell group controller 503Na as components common to the respective phases. Consequently, according to DC voltage instruction value Vdcref, the voltage components output from cell groups 51, 61 become DC voltage components output to DC circuit 14.

(Operation of Instruction Generation Unit 525)

Instruction generation unit 525 operates the voltage to be output from cell group 51 as voltage instruction value Vpref1, and operates the voltage to be output from cell group 61 as voltage instruction value Vnref1. Each of voltage instruction values Vpref1, Vnref1 is obtained by combining DC voltage instruction value Vdcref and AC voltage instruction value Vacref for each phase.

Specifically, cell group 51 and cell group 61 are connected in series between positive-side DC terminal Np and negative-side DC terminal Nn that are connected to DC circuit 14. Accordingly, when each of voltage instruction value Vpref1 of cell group 51 and voltage instruction value Vnref1 of cell group 61 is calculated, ½ of DC voltage instruction value Vdcref is added and combined. On the other hand, because each of AC terminals Nu, Nv, Nw are located at the connection point between positive-side arm 5 and the negative-side arm 6, AC voltage instruction value Vacref is subtracted and combined when voltage instruction value Vpref1 of cell group 51 is calculated, and AC voltage instruction value Vacref is added and combined when voltage instruction value Vnref1 of cell group 61 is calculated. Specifically, voltage instruction values Vpref1$u$, Vpref1$v$, Vpref1$w$, Vnref1$u$, Vnref1$v$, Vnref1$w$ are expressed as the following Equations (12) to (17).

$$Vpref1u = Vdcref/2 - Vacrefu \quad (12)$$

$$Vpref1v = Vdcref/2 - Vacrefv \quad (13)$$

$$Vpref1w = Vdcref/2 - Vacrefw \quad (14)$$

$$Vnref1u = Vdcref/2 + Vacrefu \quad (15)$$

$$Vnref1v = Vdcref/2 + Vacrefv \quad (16)$$

$$Vnref1w = Vdcref/2 + Vacrefw \quad (17)$$

Further, a zero-phase potential Vn is expressed by the following Equation (18).

$$Vn = Vacrefu + Vacrefv + Vacrefw \quad (18)$$

For example, in leg circuit 4$u$ of FIG. 1, when cell group 51 outputs the AC voltage having a relatively small value and when cell group 61 outputs the AC voltage having a relatively large value, the potential of AC terminal Nu approaches the potential of positive DC terminal Np, and a high voltage is output to AC terminal Nu. Specifically, cell group 61 outputs the AC voltage having the same polarity as the AC voltage to be output from AC terminal Nu, and cell group 51 outputs the AC voltage having the opposite polarity to the AC voltage to be output from AC terminal Nu.

In power conversion device 1, instruction generation unit 525 combines the positive and negative phase components and the zero-phase component included in the AC voltage instruction value Vacref with the DC voltage instruction value Vdcref by the above operation, but does not combine voltage components that cause the circulating current to flow to achieve energy balance between phases, and does not combine a voltage components that control the circulating current.

(Operation of Circulating Current Controller 526)

U-phase, V-phase, W-phase circulating currents Iccu, Iccv, Iccw operated by current arithmetic unit 521 are sent to circulating current controller 526. Circulating current controller 526 performs feedback control such that the circulating current value is matched with the circulating current instruction value. That is, a compensator that amplifies a deviation between the circulating current instruction value and the circulating current value is provided in circulating current controller 526. At this point, a zero current is usually given as the circulating current instruction value, but a non-zero value may be given when imbalance is generated in the power system. Circulating current controller 526 outputs voltage components to be output by cell groups 52, 62 for the circulating current control as voltage instruction value Vccref.

The circulating current is a current flowing between legs of different phases. Cell groups 51, 61 and reactors 8A, 8B exist in a current path of the circulating current, and the circulating current is generated by applying the potential difference generated by switching of cell groups 51, 61 to reactors 8A, 8B. Accordingly, when voltages of opposite polarities are applied to the reactor by cell groups 52, 62 provided in the same path, the circulating current is prevented.

For example, in the case where circulating current Iccu flows from the positive-side DC terminal to the negative-side DC terminal of leg circuit 4u, the voltage in the direction in which the circulating current is decreased is applied to the reactors 8A, 8B when the positive voltage is output in each of cell groups 52, 62 of leg circuit 4u. When the current flows in the reverse direction of the above, the circulating current is attenuated when the voltages at cell groups 52, 62 are also applied in the reverse direction. Circulating current controller 526 executes feedback control such that the circulating current instruction value and the circulating current value are matched with each other.

(Operation of Capacitor Voltage Controller 527)

The voltage at capacitor 32 of each converter cell 7b constituting each of cell groups 52, 62 is detected by voltage detector 33. Voltage arithmetic unit 522 operates capacitor voltages Vcpu2, Vcpv2, Vcpw2 of converter cells 7b of cell group 52 and capacitor voltages Vcnu2, Vcnv2, Vcnw2 (simply referred to as "capacitor voltage") of converter cells 7b of cell group 62.

The compensator provided in capacitor voltage controller 527 performs control operation such that the capacitor voltages at cell groups 52, 62 of the respective phases follow the capacitor voltage instruction value. Capacitor voltage controller 527 outputs a result obtained by multiplying the control arithmetic result by the polarity (for example, 1 or −1) of arm current Iarm to adders 5i, 5j as the correction value for the circulating current control.

Specifically, capacitor voltage controller 527 performs the control operation such that capacitor voltages Vcpu2, Vcpv2, Vcpw2 follow the capacitor voltage instruction value, and multiplies the control arithmetic result by the polarities of the positive arm currents Ipu, Ipv, Ipw to generate correction values Vpcorru, Vpcorrv, Vpcorrw (hereinafter, also collectively referred to as a "correction value Vpcorr") for the U-phase, the V-phase, and the W-phase. In addition, capacitor voltage controller 527 performs the control operation such that capacitor voltages Vcnu2, Vcnv2, Vcnw2 follow the capacitor voltage instruction value, and multiplies the control arithmetic result by the polarities of negative arm currents Inu, Inv, Inw to generate correction values Vncorru, Vncorrv, Vncorrw (hereinafter, also collectively referred to as a "correction values Vncorr") for the U-phase, the V-phase, and the W-phase.

(Operation of Adders 5i, 5j)

Adder 5i adds circulating voltage instruction value Vccref for circulating current control, a value proportional to voltage instruction value Vpref1 for cell group 51, and correction value Vpcorr for each phase. The addition result of adder 5i is output to adder 5k as voltage values Vxpu, Vxpv, Vxpw (hereinafter, also collectively referred to as "voltage value Vxp") in the U-phase, the V-phase, and the W-phase. Adder 5j adds voltage instruction value Vccref2 for the circulating current control, a value proportional to voltage instruction value Vnref1 for cell group 61, and correction value Vncorr for each phase. The addition result of adder 5j is output to adder 5m as voltage values Vxnu, Vxnv, Vxnw (hereinafter, also collectively referred to as "voltage value Vxn") in the U-phase, the V-phase, and the W-phase.

The reason why the proportional values of the voltage instruction values are added in adders 5i, 5j is that the half bridge type in FIG. 2(a) is used for converter cells 7b constituting cell groups 52, 62 for the circulating current control. Because the half-bridge type converter cell can output only the zero voltage or the positive voltage, in order to increase or decrease the output voltage of converter cell 7 according to the increase or decrease in the circulating current, the output voltage is required to increase or decrease based on a certain voltage value. However, when the voltage serving as the reference is fixed to a constant value, undesirably capacitor 32 continues to be charged by DC current Idc flowing between DC circuit 14 and leg circuit 4. In order to avoid this problem, k times of voltage instruction values Vpref1, Vnref1n for cell groups 51, 61 are added to voltage instruction values Vpref2, Vnref2 for cell groups 52, 62 as the reference voltages.

Thus, under the current conditions corresponding to the voltage instruction values Vpref1, Vnref1, the deviation between the AC power and the DC power generated in converter cells 7b constituting cell groups 52, 62 can be reduced (that is, the active power flowing into or out of converter cell 7b approaches zero), so that the voltage fluctuation of capacitors 32 of converter cells 7b can be prevented. Gain k is set to an arbitrary value such that the output voltage of converter cell 7b is not saturated when voltage instruction value Vccref for the circulating current control is given.

When converter cell 7b of cell groups 52, 62 for the circulating current control is configured of converter cell 7 having the full-bridge configuration in FIG. 2(b), converter cell 7b can output the voltage at both poles, so that gain k can also be set to zero. In this case, when the capacitor voltage at converter cells 7b does not decrease, basic controller 502b controls the output voltages at the plurality of converter cells 7b in each arm based on voltage instruction value Vccref and voltage instruction values Vpref2, Vnref2 generated by correction values Vpcorr, Vncorr. When the capacitor voltage at converter cells 7b decreases, basic controller 502b linearly combines auxiliary voltage instruction values Vssp, Vssn, voltage instruction value Vccref, and correction values Vpcorr, Vncorr to generate voltage instruction values Vpref2, Vnref2.

Furthermore, the reason why the correction value is added in adders 5i, 5j will be described. Because the voltages output from cell groups 52, 62 for the circulating current control have a function of controlling the currents flowing through reactors 8A, 8B, the output power of cell groups 52, 62 becomes substantially reactive power. However, when the active power due to the loss exists in reactors 8A, 8B cannot be ignored, the active power is required to be supplied to cell groups 52, 62. This is because the voltages at capacitors 32 of cell groups 52, 62 cannot be maintained only by providing proportional values of voltage instruction values Vpref1, Vnref1 to the cell groups 52, 62.

According to the above configuration, (i) when arm current Iarm is positive (polarity=1) and when the capacitor voltage is smaller than the instruction value, the compensator outputs the positive signal. Accordingly, by multiplying the output of the compensator by the polarity (=1) of arm current Iarm, the correction value for the circulating current control becomes the signal having the positive component. The signal of the correction value lengthens the period during which switching element 31p is conductive, so that the period during which arm current Iarm flows into capacitor 32 increases. As a result, the deviation between the capacitor voltage instruction value and the detection value of the capacitor voltage is eliminated because capacitor 32 is charged.

(ii) When arm current Iarm is positive (polarity=1) and when the capacitor voltage is larger than the instruction value, the compensator outputs the negative signal. Accordingly, by multiplying the output of the compensator by the polarity (=1) of arm current Iarm, the correction value for the circulating current control becomes the signal having the negative component. The signal of the correction value shortens the period during which switching element 31p is conductive, so that the deviation between the capacitor voltage instruction value and the detection value of the capacitor voltage is eliminated.

(iii) When arm current Iarm is negative (polarity=−1) and when the capacitor voltage is smaller than the instruction value, the compensator outputs the positive signal. Accordingly, by multiplying the output of the compensator by the polarity (=−1) of arm current Iarm, the correction value for the circulating current control becomes the signal having the negative component. The signal of the correction value shortens the period during which switching element 31p is conductive, so that the period during which arm current Iarm flows out of capacitor 32 decreases. As a result, the deviation between the capacitor voltage instruction value and the detection value of the capacitor voltage is eliminated because the discharge time of capacitor 32 decreases.

(iv) When arm current Iarm is negative (polarity=−1) and when the capacitor voltage is larger than the instruction value, the compensator outputs the negative signal. Accordingly, by multiplying the output of the compensator by the polarity (=−1) of arm current Iarm, the correction value for the circulating current control becomes the signal having the positive component. The discharge time of capacitor 32 increases because the signal of the correction value lengthens the period during which switching element 31p is conductive, so that the deviation between the capacitor voltage instruction value and the detection value of the capacitor voltage is eliminated.

(Operation of Auxiliary Voltage Generation Unit 528)

In the above description, the capacitor voltage is maintained by the correction value output from capacitor voltage controller 527. However, when the magnitude of arm current Iarm is small and when the active power and the reactive power output from power conversion device 1 are small, converter cells 7b of cell groups 52, 62 that do not perform the AC-DC conversion control cannot sufficiently charge capacitor 32 even with the correction value by capacitor voltage controller 527. In this case, the voltage at capacitor 32 of converter cell 7b cannot be maintained but decreases. Accordingly, when the voltage at capacitor 32 of converter cell 7b is less than a certain value, auxiliary voltage generation unit 528 generates such an auxiliary voltage instruction value that the voltage at capacitor 32 is maintained (that is, capacitor 32 is charged).

Specifically, auxiliary voltage generation unit 528 receives capacitor voltages Vcpu2, Vcpv2, Vcpw2 at cell group 52 of each phase and the capacitor voltages Vcnu2, Vcnv2, Vcnw2 at cell group 62 of each phase. Auxiliary voltage generation unit 528 determines whether at least one of capacitor voltages Vcpu2, Vcpv2, Vcpw2, Vcnu2, Vcnv2, Vcnw2 is less than a threshold Th1.

When at least one capacitor voltage is less than threshold Th1, auxiliary voltage generation unit 528 determines that the capacitor voltage decreases, and generates the auxiliary voltage instruction value including at least one of a DC voltage component (hereinafter, referred to as a "DC component") and a fundamental frequency component (hereinafter, referred to as a "fundamental AC component") of the AC voltage of AC circuit 12 based on DC current Idc and AC current Iac. Specifically, auxiliary voltage instruction values Vsspu, Vsspv, Vsspw (hereinafter, also collectively referred to as "Vssp") for the U-phase, V-phase, and W-phase cell groups 52 and auxiliary voltage instruction values Vssnu, Vssnv, Vssnw (hereinafter, also collectively referred to as "Vssn") for the U-phase, V-phase, and W-phase cell groups 62 are generated. For example, threshold Th1 is set to about 90% of the rated value of the capacitor voltage.

(i) When the DC component is included in auxiliary voltage instruction value Vss, auxiliary voltage generation unit 528 sets the sign of the DC component based on the direction of DC current Idc flowing into power conversion circuit unit 2. Specifically, when DC current Idc flows from DC circuit 14 to positive-side DC terminal Np, auxiliary voltage generation unit 528 sets the sign of the DC component to positive (that is, the direction in which converter cell 7b outputs the positive voltage). On the other hand, when DC current Idc flows from DC circuit 14 to negative-side DC terminal Nn, auxiliary voltage generation unit 528 sets the sign of the DC component to negative (that is, the direction in which converter cell 7b outputs the negative voltage).

When the voltage instruction value to which auxiliary voltage instruction value Vss is added is provided to cell groups 52, 62, cell groups 52, 62 can give and receive the DC power. Consequently, the charge of capacitor 32 of converter cell 7b is promoted, and the voltage at capacitor 32 can be maintained or increased.

(ii) When the fundamental AC component is included in auxiliary voltage instruction value Vss, auxiliary voltage generation unit 528 sets the phase of the fundamental AC component based on the phase of AC current Iac flowing into power conversion circuit unit 2. Specifically, auxiliary voltage generation unit 528 sets the phase of the fundamental AC component such that the phase difference between AC current Iac flowing into power conversion circuit unit 2 and the fundamental AC component becomes less than ±90°. More preferably, auxiliary voltage generation unit 528 sets the phase of the fundamental AC component such that the phase of the fundamental AC component is in the same phase (that is, the phase difference is zero) as the phase of AC current Iac.

When the voltage instruction value to which auxiliary voltage instruction value Vss is added is given to cell groups 52, 62, cell groups 52, 62 can give and receive the AC power. Consequently, the charge of capacitor 32 of converter cell 7b is promoted, and the voltage at capacitor 32 can be maintained or increased.

(iii) In the DC component and the fundamental AC component, the component effective for charging capacitor 32 can also be included in auxiliary voltage instruction value Vss. Auxiliary voltage generation unit 528 calculates auxiliary DC power from DC current Idc flowing into power conversion circuit unit 2 and the maximum value of the DC component, and calculates auxiliary AC power (more specifically, auxiliary active power) from AC current Iac flowing into power conversion circuit unit 2 and the maximum amplitude value of the fundamental AC component. The maximum value of the DC component and the maximum amplitude value of the fundamental AC component are known and previously stored in an internal memory of control device 3.

Auxiliary voltage generation unit 528 determines whether the auxiliary DC power is larger than the auxiliary AC power. Auxiliary voltage generation unit 528 generates auxiliary voltage instruction value Vss including the DC component when the auxiliary DC power is larger than the auxiliary AC power, and generates auxiliary voltage instruction value Vss including the fundamental AC component when the auxiliary DC power is smaller than the auxiliary AC power. When the auxiliary DC power and the auxiliary AC power are the same, auxiliary voltage generation unit 528 generates auxiliary voltage instruction value Vss including either the DC component or the fundamental AC component.

As described above, when the voltage instruction value to which auxiliary voltage instruction value Vss is added is given to cell groups 52, 62, cell groups 52, 62 can efficiently give and receive the power, and the charge of capacitor 32 of converter cell 7b is promoted.

(iv) As described above, auxiliary voltage generation unit 528 generates auxiliary voltage instruction value Vss. Thereafter, when the capacitor voltage is restored by the generation of auxiliary voltage instruction value Vss, auxiliary voltage generation unit 528 stops the generation and output of auxiliary voltage instruction value Vss. Specifically, when all the capacitor voltages (that is, each of capacitor voltages Vcpu2, Vcpv2, Vcpw2, Vcnu2, Vcnv2, Vcnw2) become equal to or larger than a threshold Th2, auxiliary voltage generation unit 528 stops the generation and output of auxiliary voltage instruction value Vss. In order to prevent chattering and the like, threshold Th2 is set to be larger than threshold Th1 and to be close to the rated value of the capacitor voltage (for example, 99% of the rated value). Auxiliary voltage generation unit 528 may be configured to generate auxiliary voltage instruction value Vss including both the DC component and the fundamental AC component as described above.

(Operations of Adders 5k, 5m)

Adder 5k adds voltage value Vxp and auxiliary voltage instruction value Vssp for each phase. The addition result of adder 5k is input to positive-side cell group controller 503Pb as a voltage instruction value Vpref2 (for U-phase: Vpref2u, for V-phase: Vpref2v, for W-phase: Vpref2w) representing the voltage component to be output from cell group 52 for the circulating current control. Adder 5m adds voltage value Vxn and auxiliary voltage instruction value Vssn for each phase. The addition result of adder 5m is input to negative-side cell group controller 503Nb as a voltage instruction value Vnref2 (for U phase: Vnref2u, for V phase: Vnref2v, for W phase: Vnref2w) representing the voltage component to be output from cell group 62 for the circulating current control. In adders 5k, 5m, the voltage instruction value to which the auxiliary voltage instruction value is added is given to cell groups 52, 62, so that the charge of capacitor 32 of each converter cell 7b can be promoted.

At this point, because inter-DC terminal voltage Vdc is controlled by cell groups 51, 61, even when auxiliary voltage instruction value Vss including the DC component is added to the voltage instruction value for cell groups 52, 62, inter-DC terminal voltage Vdc does not greatly fluctuate. When starting the output of the auxiliary voltage instruction value Vss by determining that the capacitor voltage is lowered, auxiliary voltage generation unit 528 changes the effective value of auxiliary voltage instruction value Vss including the DC component in a ramp shape, so that the instantaneous fluctuation can also be prevented. Similarly, auxiliary voltage generation unit 528 may change the effective value of auxiliary voltage instruction value Vss in the ramp shape when stopping the output of auxiliary voltage instruction value Vss by determining that the capacitor voltage is returned.

In addition, because AC voltage Vac is controlled by cell groups 51, 61, the AC voltage and the AC current do not fluctuate even when auxiliary voltage instruction value Vss including the fundamental AC component is added to the voltage instruction value for cell groups 52, 62. When starting and stopping the output of auxiliary voltage instruction value Vss, auxiliary voltage generation unit 528 changes the effective value of auxiliary voltage instruction value Vss including the fundamental AC component in the ramp shape, so that auxiliary voltage generation unit 528 can prevent the instantaneous fluctuation.

(Configuration and Operation of Cell Group Controller 503)

Figure 5:
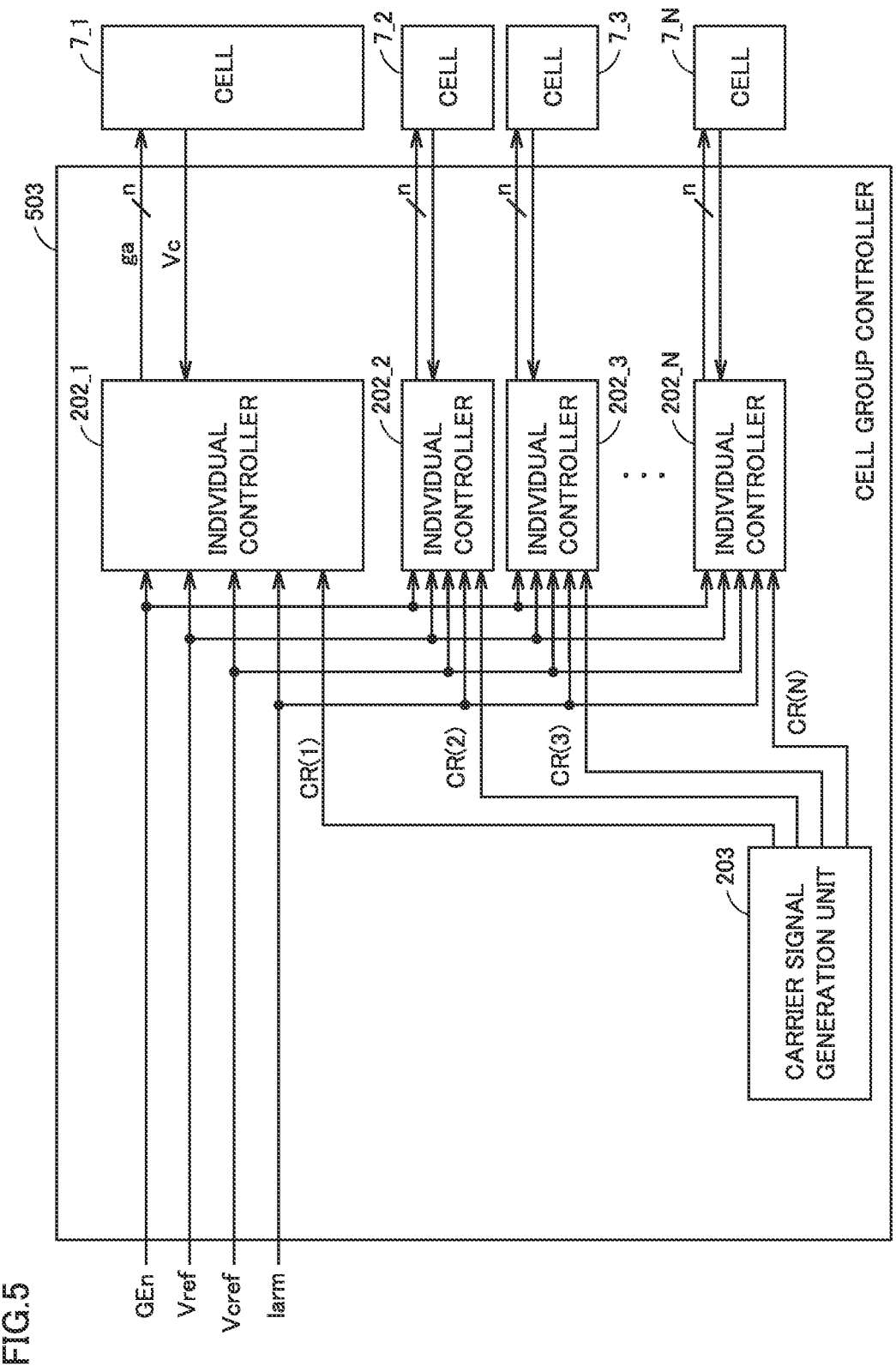
FIG. 5 is a view illustrating a configuration of a cell group controller.

FIG. 5 is a view illustrating a configuration of cell group controller 503. With reference to FIG. 5, cell group controller 503 includes N individual controllers 202_1 to 202_N (hereinafter, also collectively referred to as an "individual controllers 202"). For example, N1 converter cells 7a are included in cell groups 51, 61. Accordingly, each of positive-side cell group controller 503Pa and negative-side cell group controller 503Na corresponding to cell groups 51, 61 includes N1 individual controllers 202. Hereinafter, for the sake of description, voltage instruction values Vpref1, Vnref1, Vpref2, Vnref2 will be collectively referred to as a voltage instruction value Vref.

Individual controller 202_i individually controls corresponding converter cells 7. Individual controller 202_i receives voltage instruction value Vref, arm current Iarm, capacitor voltage instruction value Vcref, and a switching permission signal GEn from basic controller 502. Capacitor voltage instruction value Vcref and switching permission signal GEn are generated by basic controller 502. For example, capacitor voltage instruction value Vcref is a rated value of capacitors 32 of the plurality of converter cells 7 included in each cell group. Individual controller 202_i receives capacitor voltage Vc from corresponding converter cell 7_i. Individual controller 202_i transmits capacitor voltage Vc to basic controller 502.

When switching permission signal GEn is "1", each switching element 31 of converter cell 7 can perform on and off switching operation by gate signal ga. Switching permission signal GEn "1" means that converter cell 7 is in a deblocked state.

When switching permission signal GEn is "0", all switching elements 31 of converter cell 7 are turned off by gate signal ga. Switching permission signal GEn "0" means that converter cell 7 is in a gate block state. For example, when an accident is generated in the power system or when transient operation is difficult, basic controller 502 generates switching permission signal GEn having the value of "0" and outputs switching permission signal GEn to individual controller 202.

Carrier signal generation unit 203 sets a reference phase of the carrier signal for each converter cell 7, and generates the carrier signal having the set reference phase. Specifically, carrier signal generation unit 203 sets an interval between the reference phases (hereinafter, also referred to as a "carrier reference phase") of the plurality of carrier signals CR(i) to an interval obtained by dividing 360 degrees by the number N of the plurality of converter cells 7_i. The reference phase of carrier signal CR(i) represents a difference between the phase of carrier signal CR(i) and a reference phase. The phase of a carrier signal CR (0) can be used as the reference phase. Carrier signal generation unit 203 generates carrier signals CR (1) to CR (N) having the set carrier reference phase.

Individual controller 202_i receives a carrier signal CRi from carrier signal generation unit 203. Individual controller 202_i performs pulse width modulation (PWM) control on converter cell 7_i using carrier signal CRi. Specifically, when switching enabling signal GEn is "1" (that is, the converter cell 7_i is in the deblock state), individual controller 202_i modulates voltage instruction value Vref and carrier signal CRi of converter cell 7_i by the phase shift PWM method, thereby generating gate signal ga (for example, a PWM modulation signal) and outputting gate signal ga to converter cell 7_i. Individual controller 202_i performs modulation according to the configuration of converter cell 7_i. In the configuration of converter cell 7_i, the number n of PWM modulation signals to be output also increases or decreases. For example, n=2 for the converter cell in the half-bridge configuration, and n=4 for the converter cell in the full-bridge configuration.

Advantages

According to the embodiment, in power conversion device 1 including the cell group for the AC-DC conversion control and the cell group for the circulating current control, the voltage at the capacitor can be appropriately controlled even when the arm current is small.

OTHER EMBODIMENTS (1) In the above-described embodiments, in each of reactors 8A, 8B, only positive-side reactor 8A or only negative-side reactor 8B may be provided in each leg circuit 4. When only negative-side reactor 8B is provided, cell group 52 for the circulating current control becomes unnecessary, and positive-side cell group controller 503Pb, adders 5i, 5k, and gain circuit 5g related to cell group 52 are also unnecessary. Therefore, there is an advantage that the configuration of control device 3 can be simplified. Similarly, when only positive-side reactor 8A is provided, cell group 62 for the circulating current control becomes unnecessary, and negative-side cell group controller 503Nb, adders 5j, 5m, and gain circuit 5h related to cell group 62 are also unnecessary. Therefore, there is an advantage that the configuration of control device 3 can be simplified.

(2) In the above-described embodiments, converter cells 7a constituting cell groups 51, 61 not for the circulating current control and each converter cells 7b constituting cell groups 52, 62 for the circulating current control have the same configuration. Alternatively, converter cells 7a constituting cell groups 51, 61 and converter cells 7b constituting cell groups 52, 62 may have different configurations.

(3) An example in which capacitor voltage controller 527 multiplies the output of the compensator by the polarity of arm current Iarm has been described in the above-described embodiments. However, the similar effect can be obtained by multiplying the output of the compensator by the current value of arm current Iarm instead of the polarity of arm current Iarm.

(4) The configuration in which it is determined that the capacitor voltage decreases when at least one of capacitor voltages Vcpu2, Vcpv2, Vcpw2, Vcnu2, Vcnv2, Vcnw2 is less than threshold Th1 has been described in the above-described embodiments. However, the configuration is not limited to the embodiments. For example, when the capacitor voltage of at least one converter cell 7b in all converter cells 7b included in each leg circuit 4 is less than threshold Th1, it may be determined that the capacitor voltage decreases. In this case, when the capacitor voltages at all converter cells 7b included in each leg circuit 4 become equal to or greater than threshold Th2, it may be determined that the capacitor voltage is returned.

(5) In the embodiment described above, when converter cells 7b of cell groups 52, 62 have the full-bridge configuration, gain k is set to zero, and voltage instruction values Vpref2, Vnref2 are generated using voltage instruction value Vccref and correction values Vpcorr, Vncorr. However, when converter cell 7b has the full-bridge configuration, basic controller 502b may control the output voltages of the plurality of converter cells 7b in each arm using voltage instruction value Vccref and correction values Vpcorr, Vncorr without generating voltage instruction values Vpref2, Vnref2. In this case, switching elements 31p1, 31n1 of converter cell 7b are controlled based on voltage instruction value Vccref, and switching elements 31p2, 31n2 of converter cell 7b are controlled based on correction values Vpcorr, Vncorr.

Specifically, when the capacitor voltage at converter cell 7b does not decrease, basic controller 502b outputs voltage instruction value Vccref to positive-side cell group controller 503Pb and negative-side cell group controller 503Nb, outputs correction value Vpcorr to positive-side cell group controller 503Pb, and outputs correction value Vncorr to negative-side cell group controller 503Nb. Positive-side cell group controller 503Pb controls switching elements 31p1, 31n1 of each converter cell 7b of cell group 52 based on voltage instruction value Vccref, and controls the switching elements 31p2, 31n2 of each converter cell 7b based on correction value Vpcorr. Negative-side cell group controller 503Nb controls switching elements 31p1, 31n1 of each converter cell 7b of cell group 62 based on voltage instruction value Vccref, and controls switching elements 31p2, 31n2 of each converter cell 7b based on correction value Vncorr.

On the other hand, when the capacitor voltage at converter cell 7b decreases, basic controller 502b linearly combines auxiliary voltage instruction value Vssp with voltage instruction value Vccref and correction value Vpcorr, and outputs the combined value to positive-side cell group controller 503Pb. Basic controller 502b linearly combines auxiliary voltage instruction value Vssn with voltage instruction value Vccref and correction value Vncorr, and outputs the combined value to negative-side cell group controller 503Nb. Positive-side cell group controller 503Pb controls switching elements 31p1, 31n1 of each converter cell 7b of cell group 52 based on linearly combined voltage instruction value Vccref, and controls switching elements 31p2, 31n2 of each converter cell 7b based on linearly combined correction value Vpcorr. Negative-side cell group controller 503Nb controls switching elements 31p1, 31n1 of each converter cell 7b of cell group 62 based on linearly combined voltage instruction value Vccref, and controls switching elements 31p2, 31n2 of each converter cell 7b based on linearly combined correction value Vncorr.

It should be considered that the disclosed embodiment is an example in all respects and not restrictive. The scope of the present disclosure is defined by not the description above, but the claims, and it is intended that all modifications within the meaning and scope of the claims and their equivalents are included in the present disclosure.

REFERENCE SIGNS LIST

1: power conversion device, 2: power conversion circuit unit, 3: control device, 4u, 4v, 4w: leg circuit, 5: positive-side arm, 5g, 5h: gain circuit, 5i, 5j, 5k, 5m: adder, 6: negative-side arm, 7a, 7b: converter cell, 8A, 8B: reactor, 9A, 9B: arm current detector, 10: AC voltage detector, 11A, 11B: DC voltage detector, 12: AC circuit, 13: transformer, 14: DC circuit, 16: AC current detector, 31n, 31n2, 31n1, 31p2, 31p, 31p1: switching element, 32: capacitor, 33: voltage detector, 34: bypass switch, 51, 52, 61, 62: cell group, 202: individual controller, 203: carrier signal generation unit, 501a, 501b: switching controller, 502a, 502b: basic controller, 503Na, 503Nb: negative-side cell group controller, 503Pa, 503Pb: positive-side cell group controller, 521: current arithmetic unit, 522: voltage arithmetic unit, 523: AC controller, 524: DC controller, 525: instruction generation unit, 526: circulating current controller, 527: capacitor voltage controller, 528: auxiliary voltage generation unit

The invention claimed is:

1. A power conversion device that performs power conversion between a DC circuit and an AC circuit, the power conversion device comprising:
a power conversion circuit unit including a plurality of leg circuits corresponding to a plurality of phases of the AC circuit, each of the leg circuits being configured of two arms connected in series, a connection point between the two arms being connected to a corresponding phase of the AC circuit, opposite ends of the two arms that are connected in series being connected to the DC circuit, each of the arms including a plurality of converter cells each having a capacitor and connected in series to each other; and
a control device to control operations of the plurality of converter cells, each of the plurality of converter cells being a first converter cell controlled not based on a circulating current circulating between the plurality of leg circuits or a second converter cell controlled based on the circulating current,
wherein
the control device
controls output voltages of a plurality of the first converter cells in each of the arms based on a first voltage instruction value generated based on a DC current and a DC voltage of the DC circuit and an AC current and an AC voltage of each of the phases of the AC circuit,
controls output voltages of a plurality of the second converter cells in each of the arms using a first value based on a deviation between the circulating current and a circulating current instruction value and a second value based on a deviation between a voltage at the capacitor and an instruction value of a voltage at the capacitor in the second converter cell, and
linearly combines: an auxiliary voltage instruction value including at least one of a DC component and a fundamental AC component of the AC circuit; the first value; and the second value, and uses a result of the linear combination to control the output voltages of the plurality of the second converter cells, when the voltage at the capacitor in the second converter cell is less than a first threshold.

2. The power conversion device according to claim 1, wherein the control device sets a sign of the DC component based on a direction of a DC current flowing into the power conversion circuit unit.

3. The power conversion device according to claim 2, wherein
the plurality of leg circuits are connected in parallel to each other between a high potential-side DC terminal and a low potential-side DC terminal, and
the control device
sets a sign of the DC component to positive when a DC current flows from the DC circuit to the high potential-side DC terminal, and
sets a sign of the DC component to negative when a DC current flows from the DC circuit to the low potential-side DC terminal.

4. The power conversion device according to claim 1, wherein the control device sets a phase of the fundamental AC component based on a phase of an AC current flowing into the power conversion circuit unit.

5. The power conversion device according to claim 4, wherein the control device sets the phase of the fundamental AC component such that the phase of the fundamental AC component is in same phase with the phase of the AC current flowing into the power conversion circuit unit.

6. The power conversion device according to claim 1, wherein
the control device
determines whether auxiliary DC power calculated from the DC current flowing into the power conversion circuit unit and a maximum value of the DC component is larger than auxiliary AC power calculated from the AC current flowing into the power conversion circuit unit and a maximum amplitude value of the fundamental AC component,
generates the auxiliary voltage instruction value including the DC component when the auxiliary DC power is larger than the auxiliary AC power, and
generates the auxiliary voltage instruction value including the fundamental AC component when the auxiliary DC power is smaller than the auxiliary AC power.

7. The power conversion device according to claim 1, wherein the control device changes an effective value of the auxiliary voltage instruction value in a ramp shape.

8. The power conversion device according to claim 1, wherein the second converter cell is a full-bridge type.

9. The power conversion device according to claim 1, wherein a first arm in the two arms includes the plurality of the first converter cells, the plurality of the second converter cells, and a first reactor, and a second arm in the two arms includes the plurality of the first converter cells and the plurality of the second converter cells.

10. The power conversion device according to claim 9, wherein the second arm further includes a second reactor.

11. The power conversion device according to claim 2, wherein the control device sets a phase of the fundamental AC component based on a phase of an AC current flowing into the power conversion circuit unit.

12. The power conversion device according to claim 3, wherein the control device sets a phase of the fundamental AC component based on a phase of an AC current flowing into the power conversion circuit unit.

13. The power conversion device according to claim 2, wherein the control device
determines whether auxiliary DC power calculated from the DC current flowing into the power conversion circuit unit and a maximum value of the DC component is larger than auxiliary AC power calculated from the AC current flowing into the power conversion circuit unit and a maximum amplitude value of the fundamental AC component,
generates the auxiliary voltage instruction value including the DC component when the auxiliary DC power is larger than the auxiliary AC power, and
generates the auxiliary voltage instruction value including the fundamental AC component when the auxiliary DC power is smaller than the auxiliary AC power.

14. The power conversion device according to claim 3, wherein the control device
determines whether auxiliary DC power calculated from the DC current flowing into the power conversion circuit unit and a maximum value of the DC component is larger than auxiliary AC power calculated from the AC current flowing into the power conversion circuit unit and a maximum amplitude value of the fundamental AC component,
generates the auxiliary voltage instruction value including the DC component when the auxiliary DC power is larger than the auxiliary AC power, and
generates the auxiliary voltage instruction value including the fundamental AC component when the auxiliary DC power is smaller than the auxiliary AC power.

15. The power conversion device according to claim 4, wherein the control device
determines whether auxiliary DC power calculated from the DC current flowing into the power conversion circuit unit and a maximum value of the DC component is larger than auxiliary AC power calculated from the AC current flowing into the power conversion circuit unit and a maximum amplitude value of the fundamental AC component,
generates the auxiliary voltage instruction value including the DC component when the auxiliary DC power is larger than the auxiliary AC power, and
generates the auxiliary voltage instruction value including the fundamental AC component when the auxiliary DC power is smaller than the auxiliary AC power.

16. The power conversion device according to claim 5, wherein the control device
determines whether auxiliary DC power calculated from the DC current flowing into the power conversion circuit unit and a maximum value of the DC component is larger than auxiliary AC power calculated from the AC current flowing into the power conversion circuit unit and a maximum amplitude value of the fundamental AC component,
generates the auxiliary voltage instruction value including the DC component when the auxiliary DC power is larger than the auxiliary AC power, and
generates the auxiliary voltage instruction value including the fundamental AC component when the auxiliary DC power is smaller than the auxiliary AC power.

17. The power conversion device according to claim 2, wherein the control device changes an effective value of the auxiliary voltage instruction value in a ramp shape.

18. The power conversion device according to claim 3, wherein the control device changes an effective value of the auxiliary voltage instruction value in a ramp shape.

19. The power conversion device according to claim 4, wherein the control device changes an effective value of the auxiliary voltage instruction value in a ramp shape.

20. The power conversion device according to claim 5, wherein the control device changes an effective value of the auxiliary voltage instruction value in a ramp shape.

* * * * *